No. 843,091. PATENTED FEB. 5, 1907.
P. J. McCORMICK.
ATTACHMENT FOR PLANING MACHINES.
APPLICATION FILED AUG. 9, 1906.
3 SHEETS—SHEET 1.
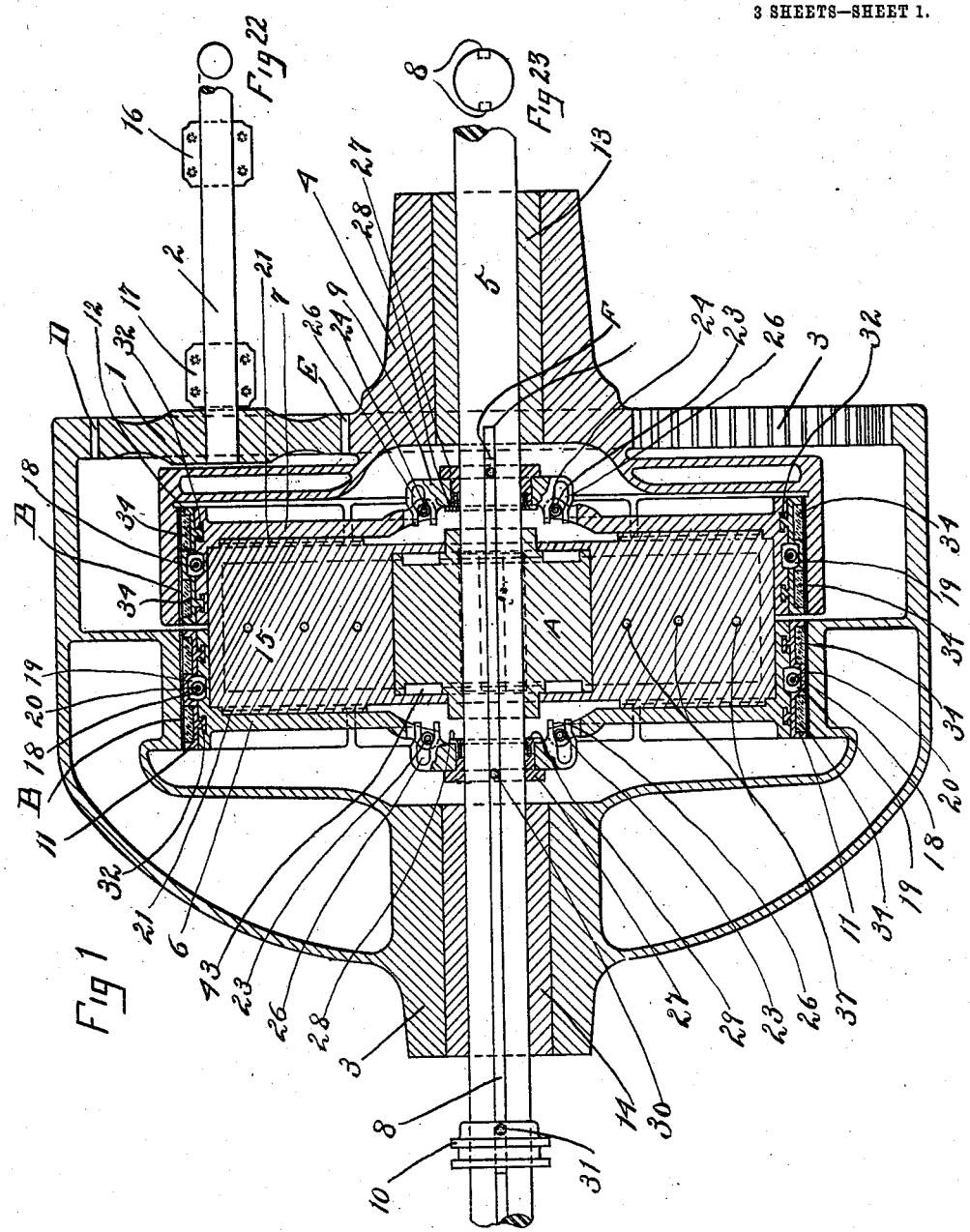
Witnesses
John Henry Parker.
E. Walton Brewington.
Inventor
Peter J. McCormick.
Henry S. Brewington
By
his
Attorney

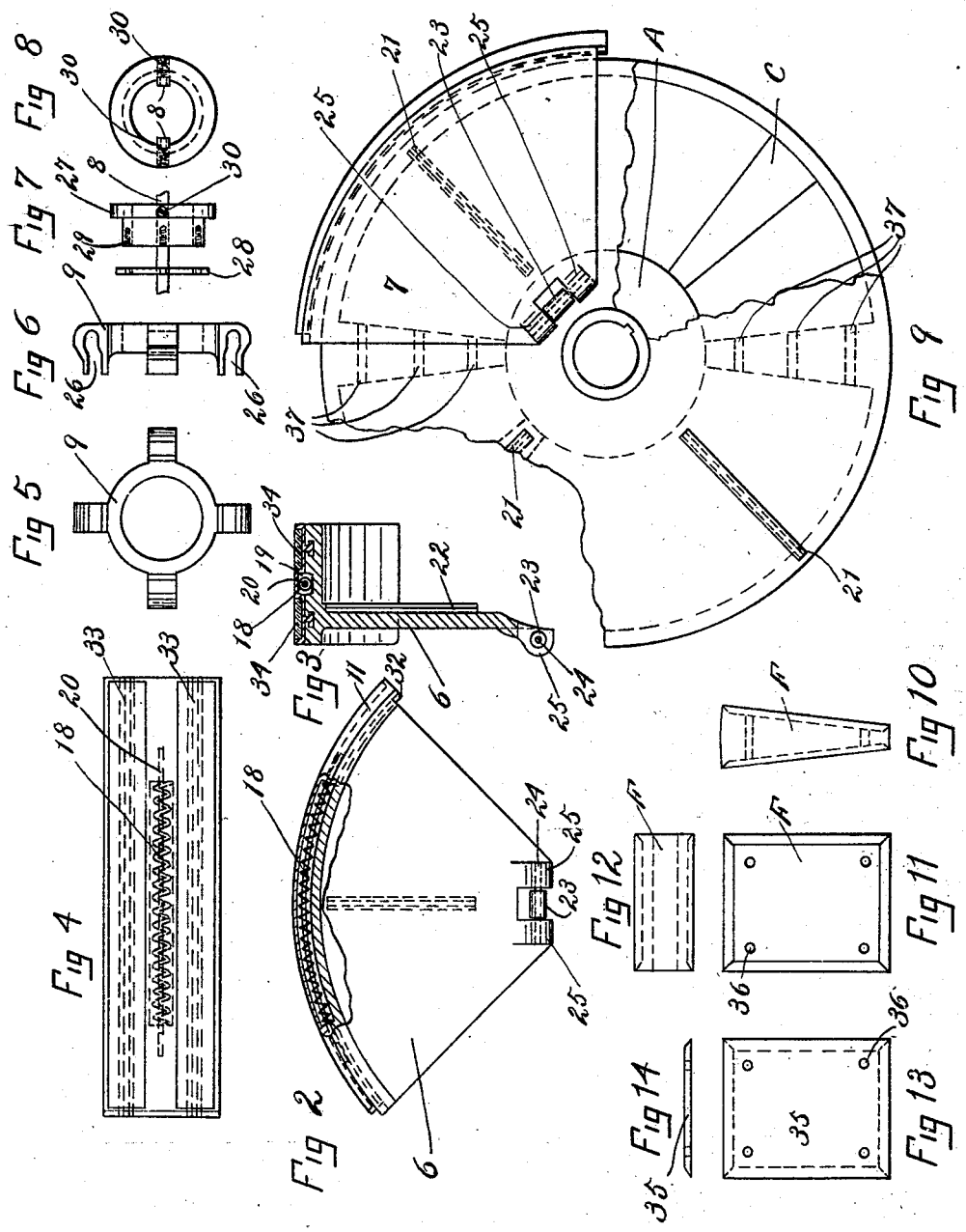

No. 843,091. PATENTED FEB. 5, 1907.
P. J. McCORMICK.
ATTACHMENT FOR PLANING MACHINES.
APPLICATION FILED AUG. 9, 1906.
3 SHEETS—SHEET 3.
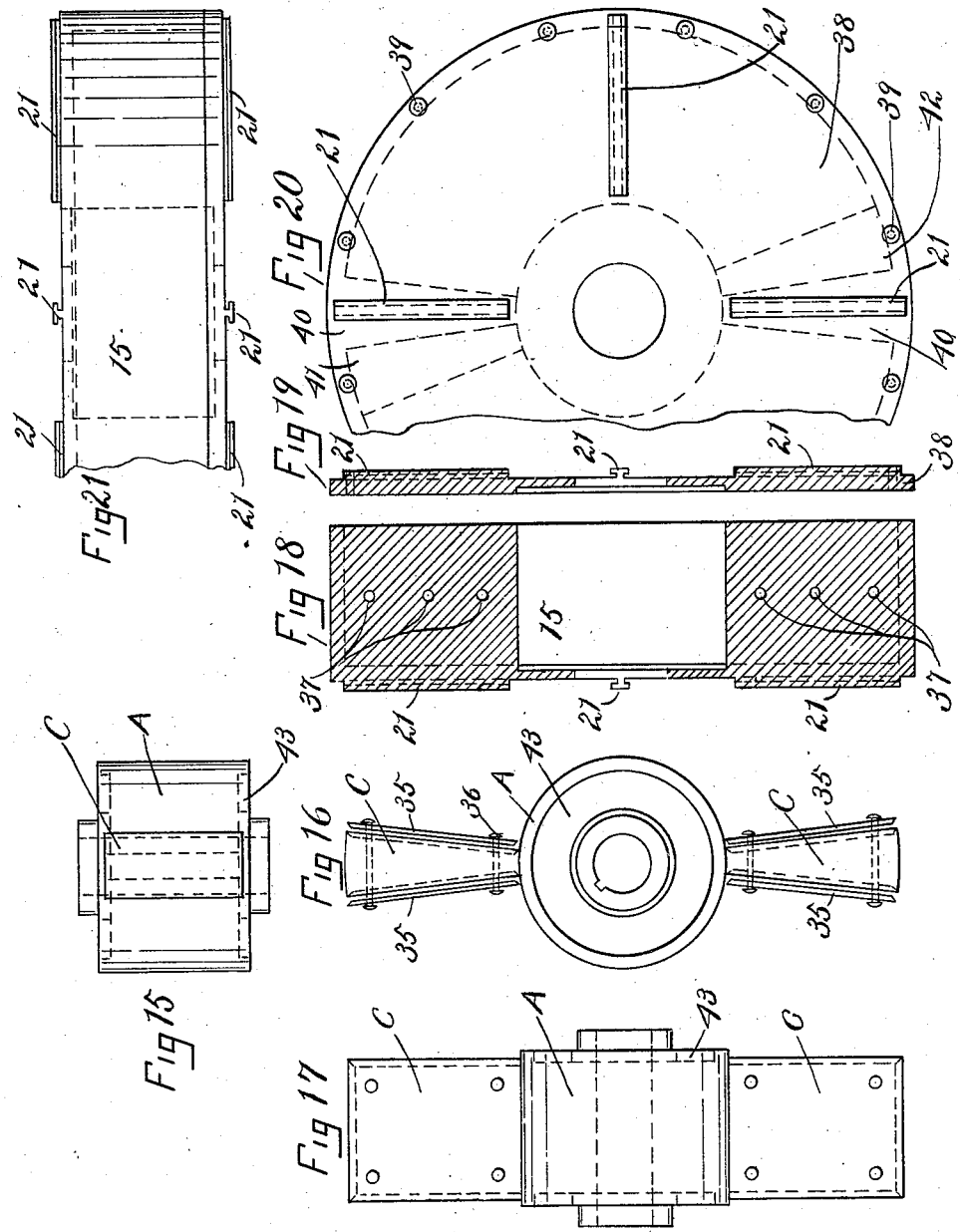

UNITED STATES PATENT OFFICE.

PETER J. McCORMICK, OF BALTIMORE, MARYLAND.

ATTACHMENT FOR PLANING-MACHINES.

No. 843,091.          Specification of Letters Patent.          Patented Feb. 5, 1907.

Application filed August 9, 1906. Serial No. 329,861.

*To all whom it may concern:*

Be it known that I, PETER J. MCCORMICK, a citizen of the United States, residing at Baltimore city and State of Maryland, have invented certain new and useful Improvements in Attachments for Planing-Machines, of which the following is a specification.

My invention relates to an improvement in planing-machines, the object of which is to provide a device which can be attached to any ordinary planing-machine now in use as well as to other similar machines which are operated by two motions and which reverse alternately at a high rate of speed and at the same time to dispense with the counter-shaft, pulleys, belting, and cam-plate used to shift the belting such as is ordinarily used in connection with machines of this class. By the means which I employ I have produced a machine in which the time usually consumed in causing the alternate motion or the shifting of the driving mechanism is greatly lessened, thereby causing an increase in the productiveness of the machine, and consequently a corresponding decrease in the cost of the product manufactured by the use thereof. It is obvious that my invention can be embodied in a machine as built in the first instance as well as if not to a better advantage than when applied to those already in use.

With the foregoing object in view my invention consists in certain new and novel features of construction and combinations of parts, which will be hereinafter described, and pointed out in the claims.

In the accompanying drawings, Figure 1 is a sectional view of the assembled parts shown in their proper relation to each other in a vertical plane. Fig. 2 is a side view of one of the segment-shaped clutches. Fig. 3 is a sectional view of the same, and Fig. 4 is a plan view of the periphery thereof. Fig. 5 is an end view, and Fig. 6 a side view, of a forked cam 9. Fig. 7 is a view of the cam-sleeve 27 with the keys 8 8 attached and plate 28 removed. Fig. 8 is an end view of the same. Fig. 9 is a partial side view of the oil-cylinder 15 with one clutch in position thereon, it being broken away at one point to show a paddle-blade C, attached to paddle-casting A. Fig. 10 is a side view of a blade. Fig. 11 is a front view, and Fig. 12 an end view. Fig. 13 is a front, and Fig. 14 an end, view of metal plate 35. Fig. 15 is a top plan of paddle-casting A. Fig. 16 is a side, and Fig. 17 a front, view of the same. Fig. 18 is a sectional view of the oil-cylinder 15; Fig. 19, a sectional view of its removable cover 38. Fig. 20 is a partial outside view of cover 38. Fig. 21 is a partial plan view of the exterior of the oil-cylinder with cover attached. Fig. 22 is an end view of the shaft 2. Fig. 23 is an end view of the main driven shaft 5, showing the keys 8, which operate the fork-cams.

1 is a driving-pinion from the motor, and 2 is a pinion-driving shaft from the motor.

3 is an internal gear for the forward motion.

4 is an external gear for the backward motion.

5 is the main driven shaft.

6 and 7 are clutches.

8 are keys to operate the fork-cams 9 9, which throw the clutches 6 and 7.

10 is a shipper-collar.

11 and 12 are cam parts of the clutch.

13 and 14 are bronze bushings for the gears.

15 is the oil-drum.

A is the paddle-casting.

16 and 17 are bearings for the motor-shaft.

18 18 are springs inclosed in pockets 19 19 and guided upon the central rods 20 20.

21 21 are T-shaped ribs on the outer faces of the oil-drum 15, upon which slide the segment-shaped clutches 6 and 7, which have a corresponding groove at 22 cut in them. (See Fig. 3.)

23 23, &c., are rollers upon pins 24 24, which are secured in the projections 25 25 upon clutch-segments 6 and 7. (Shown more fully in detail, Figs. 2 and 3, Fig. 4 being a top plan of the segment-shaped clutch.) The rollers 23 23 are acted upon by the cam-shaped slot 26 in sliding cams 9 9, by which the sliding clutches 6 and 7 are forced radially outward or pulled inwardly as cams 9 9 are moved to the right or left.

Cams 9 9 are loosely fitted to sleeves 27 27, which slide upon shaft 5, being locked to the sleeves by the plates 28 28, which are secured to the sleeves by screws 29, the sleeves 27 in turn being secured to the sliding keys 8 by screws 30. Collar 10 is also secured to keys 8 by screws 31, (one of which is shown,) so that any motion imparted to collar 10 is transmitted to sleeves 27 27 and through them to fork-cams 9 9 and to clutches 6 and 7. Cam parts 11 and 12 are secured to clutches 6 and 7 by a tongue-and-groove connection 32. This groove is made eccentric in relation to center of shaft 5, so that when a cam part 11 or 12 comes in contact with gear 3 or gear 9 at points B B it slides upon cam 6 or 7, and thus tightens the grip, the release being partly effected by a spring 18, which has been compressed by the sliding motion. Parts 11 and 12 are provided with pockets 33, in which are placed wood or fibre blocks 34 for frictional contact. 43 is a recess in the casting A, in which is inserted a suitable packing.

Figs. 13 and 14 show a front and end view of a metal-plate piece 35 to inclose a suitable packing, one such being attached to each side of blades C C by studs 36, being free to move outward and inward to a limited extent in such a way as to resist the pressure of the oil or fluid being used in the oil-cylinder 15 when moving against it and to relieve such pressure when moved away from it.

37 37 are holes in the dividing-chamber in the oil-cylinder 15, Figs. 1, 9, and 18, to gradually reduce the resistance of the oil against the paddle-blades C by flowing into the opposite chamber.

In Fig. 18 is shown a sectional view of the oil-cylinder 15. Fig. 19 is a sectional view of its removable cover 38, said cover being attached to the cylinder 15 by screws at 39.

My device is operative as follows: Driving-gear 1 is keyed to the shaft 2, running direct from the motor (not shown) or driven by a belt leading from some other source of power. As the driving-gear 1 meshes with the gear 3 at D and the gear 4 at E, the turning of the gear 1 to the left will turn gear 3 to the left and gear 4 to the right on the shaft 5, as these gears are to work loosely. To give two motions to shaft 5, it has to engage with the gears 3 and 4 alternately by means of the friction-clutches 6 and 7. This is accomplished in the following manner: Shaft 5 has two keys 8 running from the shipper-collar 10 to a point designated F on the shaft 5. These keys are turned down to slide on the surface of the shaft, and cams 9 are attached to the keys. If collar 10 is moved to the left, it causes cam 9 on the right to expand the clutch-segments 7 and to bring the wood face 34 (which is a part of the clutch) into contact with the inside of the smooth face of the gear 4 at a point designated B. The clutch 7 and the cam part 12 are constructed as cams for the purpose of accomplishing this movement. By this movement the clutches are expanded automatically, the friction of the parts 11 and 12 on the gear causing them to slide on ribs 21 and the clutches to fit tighter in the gears as more load is applied. This after expansion by friction makes it possible to throw the clutches in with great ease. As the clutches are attached to the oil-drum by T-slots when they are engaged with the gear 4, they will revolve in the same direction and carry the oil-drum 15 with them. Previous to this the oil-drum 15 has been running in the opposite direction, turning with it the paddle-casting A, which is keyed tight to the shaft 5. Directly before the clutch has been shipped the paddles C on the paddle-casting A will be found to be jammed tight against the partitions 40 in the oil-drum 15, as will be seen in Fig. 20 at 41 and 42, and when the oil-drum starts in the opposite direction with the clutches the oil is forced through the openings of the oil-drum at 37, Fig. 9, and this compression of the oil offers resistance to the paddle-casting A, preventing the clutches from turning and gradually overcoming the momentum of the table (not shown) and the jar that would have been caused by the sudden reversing thereof. It will be noted that when one of the clutches is engaged the gear corresponding to the free clutch acts as a fly-wheel on the motor-shaft, both being geared to shaft 2, the direction of which is never changed.

Slight changes might be resorted to in the form and arrangement of the several parts herein described without departing from the spirit and scope of my invention. Hence I do not desire to limit myself to the exact construction as herein set forth; but, Having described my invention, what I claim as new, and desire to secure by Letters Patent, is—

1. A machine of the character described, comprising a main shaft, a driving-pinion thereon, a driven shaft, an interior gear and an exterior gear, both loose on the driven shaft and continuously in mesh with the driving-pinion, and means whereby these gears may be alternately clutched to the driven shaft, substantially as described.

2. A machine of the character described, comprising a main shaft, a driving-pinion thereon, a driven shaft, an external gear loose on the driven shaft and in mesh with one side of the pinion, an internal gear loose on the driven shaft and in mesh with the opposite side of the pinion, and means for alternately clutching the gears to the driven shaft, substantially as described.

3. A machine of the character described, comprising a main shaft, a driving-pinion thereon, a driven shaft, an external gear and an internal gear loose on the driven shaft and in mesh with the pinion, two clutches attached to revolve with the driven shaft and means for causing said clutches to alternately engage the respective gears, substantially as described.

4. A machine of the character described, comprising a main shaft, a driving-pinion thereon, a driven shaft, an external gear and an internal gear loose on the driven shaft and continuously in mesh with the driving-pinion, and each having a hollow or tubular extension, and a clutch located in each of the said tubular extensions, and arranged to revolve with the driven shaft and to be operated alternately by being made to clutch its respective gear with the driven shaft, substantially as described.

5. A machine of the character described, comprising a main shaft, a driving-pinion thereon, a driven shaft, a gear loose on the driven shaft, in mesh with the pinion and having a tubular extension, radially-movable clutches on the driven shaft and means for operating said clutches to engage the interior of said tubular extension, substantially as described.

6. A machine of the character described, comprising a main shaft, a driving-pinion thereon, a driven shaft, a pair of gears loose on the driven shaft, in mesh with the pinion and having tubular extensions, two sets of radially-movable clutches on the driven shaft, and means for causing each set of clutches to alternately engage the interior surface of its respective tubular extension, substantially as described.

7. A machine of the character described, comprising a driven shaft, two gears continuously driven in opposite directions and loose on the driven shaft, a set of radially-movable clutches for each gear, and a cam on the driven shaft for operating each set of clutches, substantially as described.

8. A machine of the character described, comprising a driven shaft, two gears loose thereon and continuously driven in opposite directions, a set of radially-movable clutches for each gear, each clutch carrying a pin, and a cam on the driven shaft for each set of clutches each having a cam-groove to engage its respective pin, substantially as described.

9. A machine of the character described, comprising a driven shaft, two gears loose thereon, and continuously driven in opposite directions, a set of radially-movable clutches for each gear, each clutch carrying a pin, and a slidable cam on the driven shaft for each set of clutches each having a cam-groove to engage its respective pin, substantially as described.

10. A machine of the character described, comprising a driven shaft, two gears loose thereon and continuously driven in opposite directions, a set of radially-movable clutches on the driven shaft for each gear, a slidable cam on the driven shaft for operating each set of clutches, a shifting collar on the driven shaft, and keys connecting said collar with each cam, substantially as described.

11. A machine of the character described, comprising a driven shaft, a pair of gears loose thereon, having tubular extensions, a set of radially-movable clutches in each extension, a slidable cam on the shaft engaging each set of clutches, and means for operating the two sets of clutches in opposite directions when the cams are simultaneously moved in one direction, substantially as described.

12. A machine of the character described, comprising a driven shaft, a pair of gears loose thereon, having tubular extensions forming a chamber, an oil-cylinder, on the shaft within said chamber, a set of radially-movable clutches mounted on each end of said chamber, and means for causing each set of clutches to alternately engage the interior of the tubular extension of its corresponding gear, substantially as described.

13. A machine of the character described, comprising a driven shaft, an oil-cylinder mounted thereon, two gears on the shaft having tubular extensions inclosing said cylinder, radial guides on each end of the oil-cylinder, a set of clutches mounted on the guides on each end of the cylinder, adapted to contact with the interior of said extensions, and a slidable cam on the shaft for operating each set of clutches alternately, substantially as described.

14. A machine of the character described, comprising a driven shaft, an oil-cylinder thereon, having removable ends, two gears on the shaft having tubular extensions inclosing the cylinder, radial guides on the ends of the cylinder, a set of clutches mounted on each set of guides and adapted to engage the interior of the extensions, and slidable cams on the shaft for operating each set of clutches alternately, substantially as described.

15. A machine of the character described, comprising a driven shaft, an oil-cylinder thereon, a pair of gears having tubular extensions inclosing the cylinder, radially-slidable clutches mounted on each end of the cylinder adapted to engage the interior of the extensions, and eccentrically-curved contact-pieces slidably mounted on the peripheries of the cams, substantially as described.

16. A machine of the character described, comprising a driven shaft, an oil-cylinder thereon, a pair of gears having tubular extensions inclosing the cylinder, radially-slidable clutches mounted on each end of the cylinder adapted to engage the interior of the extensions, and eccentrically-curved contact-pieces slidably mounted on the peripheries of the cams, yieldingly actuated in the direction of their thinner ends, substantially as described.

17. A machine of the character described, comprising a driven shaft, an oil-cylinder mounted thereon, divided into segmental chambers with perforated separating-partitions, a paddle-casting mounted on the shaft in the center of the oil-cylinder, and paddles projecting radially from the casting into the segmental chambers, substantially as described.

18. A machine of the character described, comprising a driven shaft, an oil-cylinder mounted thereon, divided into segmental chambers, with perforated separating-walls, a paddle-casting mounted on the shaft in the center of the oil-cylinder, paddles projecting radially from the casting into the segmental chambers, and plates on each side of each paddle connected by pins passing through holes in the paddles, substantially as described.

In testimony whereof I affix my signature in presence of two witnesses.

PETER J. McCORMICK.

Witnesses:
E. WALTON BREWINGTON,
MARY M. MAGRAW.